United States Patent [19]

Umeda et al.

[11] Patent Number: 4,906,680

[45] Date of Patent: Mar. 6, 1990

[54] RUBBER COMPOSITION AND STEEL CORD-RUBBER COMPOSITE BODY

[75] Inventors: Tadahiro Umeda, Kodaira; Hitoshi Kondo, Higashimurayama; Teiichiro Kadoguchi, Kodaira; Michitaka Takeshita, Koganein, all of Japan

[73] Assignee: Bridgestone Corporation, Tokyo, Japan

[21] Appl. No.: 384,114

[22] Filed: Jul. 21, 1989

Related U.S. Application Data

[62] Division of Ser. No. 181,344, Apr. 14, 1988, abandoned.

[30] Foreign Application Priority Data

Apr. 14, 1987 [JP] Japan .................. 62-89779
Feb. 8, 1988 [JP] Japan .................. 63-25827

[51] Int. Cl.$^4$ ............................................. C08K 5/55
[52] U.S. Cl. .................................................... 524/183
[58] Field of Search .......................................... 524/183

[56] References Cited

U.S. PATENT DOCUMENTS 3,852,314 12/1974 Hamanaka .................. 524/183

FOREIGN PATENT DOCUMENTS

| 5224626 | 7/1977 | Japan . | |
|---|---|---|---|
| 5610454 | 2/1981 | Japan . | |
| 58-161604 | 9/1983 | Japan . | |
| 58-222126 | 12/1983 | Japan . | |
| 0043040 | 3/1984 | Japan . | 524/183 |
| 6015444 | 1/1985 | Japan . | |
| 1006153 | 1/1986 | Japan . | 524/183 |
| 1009476 | 1/1986 | Japan . | 524/183 |
| 6157189 | 12/1986 | Japan . | |

*Primary Examiner*—Joseph L. Schofer
*Assistant Examiner*—Peter D. Mulcahy
*Attorney, Agent, or Firm*—Sughrue, Mion, Zinn, Macpeak & Seas

[57] ABSTRACT

A particular organic boron compound is compounded with rubber or applied to the surface of the steel cord in order to improve the resistance to corrosion fatigue of steel cord as a reinforcement for rubber articles with holding good adhesion properties to rubber.

4 Claims, No Drawings

RUBBER COMPOSITION AND STEEL CORD-RUBBER COMPOSITE BODY

This is a division of application Ser. No. 181,344, filed 4/14/88 now abandoned.

BACKGROUND OF THE INVENTION

1. Field of the Invention

This invention relates to a rubber composition and a steel cord-rubber composite body, and more particularly to a technique capable of considerably improving resistance to corrosion fatigue and resistance to friction fatigue of steel cord to be embedded as a reinforcement for radial tire or the like while largely holding initial adhesion property of rubber to the steel cord, adhesion property after heat aging and adhesion stability after being left to stand in high humidity atmosphere.

2. Related Art Statement

Until now, when the radial tire reinforced with steel cords was used in a corrosion atmosphere, rust was produced in the steel cord to reduce adhesion force between rubber and steel cord, and further the breakage of steel cord called as a so-called CBU phenomenon was caused, resulting in the occurrence of fatal trouble in the radial tire.

In order to overcome the above problem, there have hitherto been made various attempts and examinations. Among them, a method of applying a rust preventive agent to the steel cord is recently noticed from a viewpoint that it hardly affects the productivity. In this connection, there are proposed some methods using the rust preventive agent. For instance, Japanese Patent Application Publication No. 52-24,626 discloses a method wherein a rust preventive lubricant composed mainly of a triester synthesized from benzene tricarboxylic acid and an alcohol having a carbon number of $6 \sim 16$ or a monoester synthesized from an aliphatic acid having a carbon number of $5 \sim 24$ and a monovalent alcohol having a carbon number of $1 \sim 10$ as a rust preventive agent is applied to the steel cord. Furthermore, Japanese Patent laid open No. 56-10,454 discloses a method wherein a protective layer of a rust preventive treating agent consisting of a surfactant such as benzotriazole derivative or the like and a film forming agent (composed mainly of a hydrocarbon polymer having a softening point or melting point of not lower than 50° C.) is formed on the surface of the steel cord.

In these methods, it is certainly possible to control the occurrence of rust, but since the rust preventive agent is applied to the surface of the steel cord in only a slight amount, the initial adhesion force of rubber to steel cord is low and the rust prevention performance is insufficient due to the rubber flow during vulcanization of tire, the fretting between steel cords during the running of tire or the like.

Furthermore, Japanese Patent laid open No. 58-161,604 discloses a method of adding monoaliphatic acid having a carbon number of $6 \sim 10$ or its metal salt to a rubber composition, and Japanese Patent laid open No. 60-15,444 discloses a method of adding boric acid or its metal salt. In the former case, however, the adhesion properties, particularly initial adhesion property and adhesion after heat aging are considerably degraded, while in the latter case, the tensile strength in the resulting rubber composition undesirably lowers.

Moreover, Japanese Patent Application Publication No. 61-57,189 discloses a method of applying various surfactants as a rust preventive agent to the steel cord. In this method, the rust prevention property can be improved without degrading the adhesion property, but the rust prevention performance is still insufficient.

SUMMARY OF THE INVENTION

It is, therefore, an object of the invention to solve the aforementioned problems of the conventional techniques and provide a rubber composition and a steel cord-rubber composite body which have largely improved adhesion properties to steel cord and give improved resistances to corrosion fatigue and friction fatigue as compared with those of the conventional technique.

The inventors have made various studies in order to solve the problems of the conventional technique and found that at least one particular organic boron compound is applied as a rubber composition or a protective layer to steel cord, whereby the improved adhesion properties and resistances to corrosion fatigue and friction fatigue are obtained, and as a result the invention has been accomplished.

According to a first aspect of the invention, there is the provision of a rubber composition comprising $0.1 \sim 5.0$ parts by weight of at least one organic boron compound represented by the following general formula:

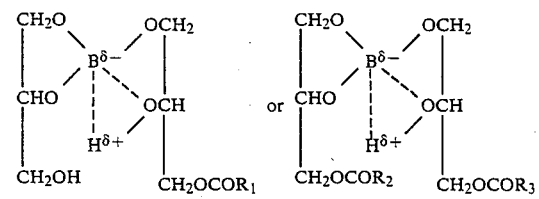

wherein each of $R_1$, $R_2$ and $R_3$ is an alkyl group having a carbon number of $7 \sim 21$ and may be substituted with a hydroxyl group, based on 100 parts by weight of rubber ingredient containing not less than 70 parts by weight of at least one of natural rubber and synthetic polyisoprene rubber.

According to a second aspect of the invention, there is the provision of a steel cord-rubber composite body produced by adhering rubber to steel cord and vulcanizing it, characterized in that a rust preventive treating agent consisting of at least one organic boron compound represented by the following general formula:

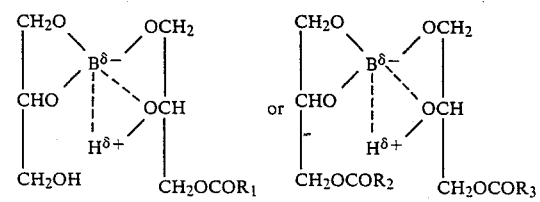

wherein each of $R_1$, $R_2$ and $R_3$ is an alkyl group having a carbon number of $7 \sim 21$ and may be substituted with a hydroxyl group, is formed as a protective layer on the surface of the steel cord.

DESCRIPTION OF THE PREFERRED EMBODIMENTS

The rubber ingredient used in the invention is preferable to be natural rubber, synthetic polyisoprene rubber or a blend thereof. When the natural rubber, synthetic polyisoprene rubber or a blend thereof is less than 70 parts by weight of the rubber ingredient, the adhesion property to steel cord undesirably degrades. Moreover, it is possible to mix the natural rubber, synthetic polyisoprene rubber or a blend thereof with less than 30 parts by weight of other diene rubber such as styrene-butadiene copolymer rubber, polybutadiene rubber of the like.

According to the invention, the organic boron compound having the above formula includes glycerol borate laurate, glycerol borate palmitate, glycerol borate stearate, glycerol borate oleate, glycerol borate isostearate, glycerol borate hydroxystearate and so on. These organic boron compounds may be used along or in admixture thereof.

The organic boron compound is compounded with the rubber ingredient in an amount of 0.1~5 parts by weight based on 100 parts by weight of the rubber ingredient. When the amount is less than 0.1 part by weight, the effect of improving the resistance to corrosion fatigue in the steel cord is not obtained, while when it exceeds 5.0 parts by weight, the effect by increasing the addition amount is not obtained and also the mechanical properties of the rubber composition are undesirably degraded.

When the organic boron compound is formed as a protective layer, it is first dissolved in a solvent, which is then applied to the surface of the steel cord. As the solvent, use may be made of petroleum fractions such as kerosine, industrial gasoline, naphtha, spindle oil, dynamo oil, machine oil, cylinder oil and the like. These solvents are used alone or in admixture thereof so as to adjust the viscosity to a given value.

According to the invention, the rust prevention treatment with the solution of the organic boron compound is performed after the drawing of steel filament constituting the steel cord. That is, the above solution may be applied to a strand composed of plural steel filaments or a cord composed of plural steel filaments or strands. The steel cords according to the invention may have any one of layer construction, strand construction, single construction, parallel construction and the like, or the surface thereof may be subjected to a plating with zinc, brass or alloy containing nickel or cobalt for improving the adhesion property to rubber.

The thickness of the protective layer is determined by the viscosity in the solution of the organic boron compound, but it is preferably about 20 μm at most in order to avoid the damage of the adhesion property of rubber with holding the good rust preventing property.

According to the invention, it is preferable to add an adhesion promoter such as cobalt naphthenate, cobalt rhodinate, cobalt stearate, cobalt-boron-organic acid compound (Manobond C-16, trade name, made by Manchem Company), cobalt or nickel salt of tall oil acid, resorcin/hexamethylene tetramine/silica, resorcin/hexamethoxymethyl melamine/silica or the like to rubber. The amount of the adhesion promoter added is within a usually used range.

In the rubber according to the invention, additives usually used in the rubber industry may properly be compounded in usually used amounts. Such additives includes a filler such as carbon black, silica or the like, a softening agent such as aromatic oil or the like, a vulcanizing agent, a vulcanization accelerator, an accelerator activator, an antioxidant and so on.

The rubber composition according to the first invention is preferably used to cover steel cord as a reinforcement for rubber articles such as tire, conveyor belt, hose and the like.

In the second invention, the organic boron compound having a rust prevention performance is applied to the surface of the steel cord to form a thin layer protecting from the rusting, whereby the rust prevention performance of the steel cord, particularly rust prevention performance under dynamic conditions is considerably improved. Furthermore, the resistance to friction fatigue due to the fretting is improved by the thin layer. Moreover, a part of the thin layer is dissolved and diffused into rubber during the vulcanization, so that the diffusion of sulfur contributing to the adhesion reaction and contained in the rubber composition onto the cord surface is not obstructed by the thin layer. Therefore, the steel cord-rubber composite bodies are favorably used in cord reinforced rubber articles such as tire and the like.

The following examples are given in illustration of the invention and are not intended as limitations thereof.

EXAMPLES 1~8, COMPARATIVE EXAMPLES 1~3

There were prepared various rubber compositions according to a compounding recipe shown in Table 1. After the vulcanization, the tensile strength was measured. Then, eleven radial tires for truck and bus having a tire size of 10.000 R20 were provided by embedding steel cords (3+9+15×0.175+1) in each of the above rubber compositions to form a carcass ply. Thereafter, the initial adhesion property, adhesion property after heat aging, adhesion property after being left to stand in high humidity atmosphere and resistance to corrosion fatigue of steel cord after the running on a drum under humidity corrosion condition were evaluated with respect to these tires to obtain results as shown in Table 1:

Moreover, the evaluation methods were as follows:
(1) Tensile strength
After the rubber composition to be tested was vulcanized at 145° C. for 30 minutes, the tensile strength was measured according to a method of JIS K6301.
(2) Initial adhesion property
A portion of the carcass ply was cut out from the tire to be tested and subjected to a peeling test between steel cord and coated rubber according to a method of JIS K6301. The property was evaluated by a rubber adhesion rate provided that the state of completely covering steel cord with rubber is 100% and the non-covered state is 0%.
(3) Adhesion property after heat aging
After the test tire was left to stand in a large oven of 120° C. for 9 days without mounting on a rim, the adhesion property was evaluated in the same manner as in the initial adhesion property.
(4) Adhesion property after being left to stand in high humidity atmosphere
After the removal of the tread portion and inner liner portion, the test tire was left to stand in a large thermohygrostat of 70° C.×90% RH for 14 days and then the adhesion property was evaluated in the same manner as in the initial adhesion property.
(5) Resistance to corrosion fatigue after the running on
a drum under humidity corrosion condition After the tread rubber of 50 mm in diameter was cut out from the central portion of the tread in the test tire so as to leave rubber of about 1 mm in thickness on steel cords of the outermost belt layer, the tire was rotated on a drum over a distance of 5,000 km under such a state that the rubber cut out portion was always wetted with water during the rotation of tire. In this case, the load, internal pressure and speed were 2,425 kg, 7.25 kg/cm$^2$ and 60 km/hr, respectively.

After the running, 10 cords in the outermost belt layer were taken out from the rubber cut out portion of the tire and subjected to a rotation bending fatigue test at a bending radius of 60 mm and a rotation speed of 3,000 rpm to measure the bending number till the breakage of the cord. Moreover, the bending number was represented as an index according to the following equation by determining average value of 10 cords. The larger the index value, the better the resistance to corrosion fatigue.

$$\frac{\text{Bending number till cord breakage in test tire}}{\text{Bending number till cord breakage in tire of Comparative Example 1}} \times 100$$

than that of Comparative Example 1, while the adhesion properties, particularly adhesion property after heat aging in Comparative Example 3 are considerably degraded as compared with those of Comparative Example 1. On the contrary, in the rubber compositions according to the invention containing the organic boron compounds shown in Examples 1~8, the resistance to corrosion fatigue of steel cord is considerably improved without badly affecting the tensile strength and adhesion properties of rubber.

EXAMPLES 9~14, COMPARATIVE EXAMPLES 4~6

In Examples 9~14, the organic boron compound shown in Table 3 was used as a rust preventive treating agent. On the other hand, the rust preventive treating agent was not used in Comparative Example 4, while Comparative Examples 5 and 6 used alkylbenzenesulfonate, and sorbitan monooleate as a rust preventive treating agent, respectively.

The above rust preventive treating agent was dissolved in a spindle oil No. 2 described in JIS K2238, which was applied to a steel cord having a single construction of 1×12+1 to form a rust preventive cord.

The thus obtained plural cords were arranged in

TABLE 1

|  | Comparative Example | | | Example | | | | | | | |
|---|---|---|---|---|---|---|---|---|---|---|---|
|  | 1 | 2 | 3 | 1 | 2 | 3 | 4 | 5 | 6 | 7 | 8 |
| natural rubber | 90 | 90 | 90 | 90 | 90 | 90 | 90 | 90 | 90 | 90 | 90 |
| synthetic polyisoprene rubber | 10 | 10 | 10 | 10 | 10 | 10 | 10 | 10 | 10 | 10 | 10 |
| carbon black HAF | 43 | 43 | 43 | 43 | 43 | 43 | 43 | 43 | 43 | 43 | 43 |
| Nocrac 6C *1 | 1 | 1 | 1 | 1 | 1 | 1 | 1 | 1 | 1 | 1 | 1 |
| ZnO | 5 | 5 | 5 | 5 | 5 | 5 | 5 | 5 | 5 | 5 | 5 |
| Nocceler MSA *2 | 0.5 | 0.5 | 0.5 | 0.5 | 0.5 | 0.5 | 0.5 | 0.5 | 0.5 | 0.5 | 0.5 |
| sulfur | 5 | 5 | 5 | 5 | 5 | 5 | 5 | 5 | 5 | 5 | 5 |
| cobalt naphthenate | 3 | 3 | 3 | 3 | 3 | 3 | 3 | 3 | 3 |  |  |
| Manobond C-16 |  |  |  |  |  |  |  |  |  | 2 |  |
| cobalt rhodinate |  |  |  |  |  |  |  |  |  |  | 4.2 |
| organic boron compound A *3 |  |  |  | 2.0 |  |  |  |  |  | 2.0 | 2.0 |
| organic boron compound B *3 |  |  |  |  | 2.0 |  |  |  |  |  |  |
| organic boron compound C *3 |  |  |  |  |  | 2.0 |  |  |  |  |  |
| organic boron compound D *3 |  |  |  |  |  |  | 2.0 |  |  |  |  |
| organic boron compound E *3 |  |  |  |  |  |  |  | 2.0 |  |  |  |
| organic boron compound F *3 |  |  |  |  |  |  |  |  | 2.0 |  |  |
| zinc orthoborate |  | 2.0 |  |  |  |  |  |  |  |  |  |
| n-capric acid |  |  | 2.0 |  |  |  |  |  |  |  |  |
| tensile strength k/cm$^2$ | 230 | 202 | 232 | 231 | 235 | 230 | 228 | 232 | 231 | 236 | 235 |
| initial adhesion property % | 90 | 85 | 80 | 90 | 90 | 90 | 90 | 90 | 90 | 95 | 100 |
| adhesion property after heat aging % | 60 | 60 | 15 | 60 | 60 | 60 | 55 | 60 | 60 | 50 | 65 |
| adhesion property after being left to stand in high humidity atmosphere % | 45 | 80 | 90 | 95 | 90 | 85 | 90 | 85 | 90 | 100 | 85 |
| resistance to corrosion fatigue | 100 | 250 | 280 | 390 | 363 | 350 | 371 | 364 | 382 | 425 | 320 |

*1, *2 ... made by Ohuchi-Shinko Kagaku Kogyo K.K.
*3 ... see Table 2

TABLE 2

|  | Trade name | Chemical structure | Maker |
|---|---|---|---|
| organic boron compound A | Emalbon S-80 | glycerol borate oleate | Toho Kagaku Kogyo K.K. |
| organic boron compound B | Emalbon S-20 | glycerol borate laurate | Toho Kagaku Kogyo K.K. |
| organic boron compound C | Emalbon S-40 | glycerol borate palmitate | Toho Kagaku Kogyo K.K. |
| organic boron compound D | Emalbon S-60 | glycerol borate stearate | Toho Kagaku Kogyo K.K. |
| organic boron compound E | Emalbon S-160 | glycerol borate isostearate | Toho Kagaku Kogyo K.K. |
| organic bron compound F | Emalbon S-260 | glycerol borate hydroxystearate | Toho Kagaku Kogyo K.K. |

As seen from Table 1, the tensile strength in Comparative Example 2 containing zinc orthoborate is lower parallel to each other and embedded in a rubber composition having a compounding recipe shown in Table 4, which was then vulcanized at 145° C. for 40 minutes to obtain a rubber lamination plate having a length of 200 mm, a width of 30 mm and a thickness of 4 mm. The adhesion properties and rust prevention property were evaluated with respect to these rubber lamination plates to obtain results as shown in Table 5. Moreover, the evaluation methods were as follows:

ADHESION PROPERTIES (1) Initial adhesion property

After the cord was peeled out from the vulcanized rubber lamination plate, the state of adhering rubber to the cord was observed. The initial adhesion property was represented by a rubber adhered state as A (100%), B (75%), C (50%), D (25%) and E (0%).

(2) Adhesion property after heat aging

After the vulcanized rubber lamination plate was left to stand in a Geer's thermostatic chamber of 100° C. for 7 days, the adhesion property was evaluated in the same manner as in the above item 1).

(3) Adhesion property after being left to stand in high humidity atmosphere

After the vulcanized rubber lamination plate was left to stand in a large thermo-hygrostat of 70° C.×95% RH for 7 days, the property was evaluated in the same manner as in the above item 1).

(4) Resistance to corrosion fatigue

After the vulcanized rubber lamination plate was left to stand in a large thermo-hygrostat of 70° C.×95% RH for 2 days, 10 cords were taken out from the plate and subjected to a rotation bending fatigue test at a bending radius of 60 mm and a rotating speed of 3,000 rpm to measure the bending number till cord breakage. Moreover, the resistance to corrosion fatigue was represented as an index according to the following equation by measuring average value of 10 cords. The larger the index value, the better the property.

$$\frac{\text{Bending number till cord breakage}}{\text{Bending number till breakage of non-treated cord}} \times 100$$

TABLE 3

| | Trade name | Chemical structure | Content in 100 g of solution (g) |
|---|---|---|---|
| organic boron compound No. 1 | Emalbon S-80 | glycerol borate oleate | 5 |
| organic boron compound No. 2 | Emalbon S-20 | glycerol borate laurate | 5 |
| organic boron compound No. 3 | Emalbon S-40 | glycerol borate palmitate | 5 |
| organic boron compound No. 4 | Emalbon S-60 | glycerol borate stearate | 5 |
| organic boron compound No. 5 | Emalbon S-160 | glycerol borate isostearate | 5 |
| organic bron compound No. 6 | Emalbon S-260 | glycerol borate hydroxystearate | 5 |

TABLE 4

| Compounding ingredient | parts by weight |
|---|---|
| natural rubber | 90 |
| synthetic polyisoprene rubber | 10 |
| carbon black HAF | 50 |
| antioxidant Nocrac 6C | 1 |
| ZnO | 5 |
| Vulcanization accelerator (Nocceler MSA) | 0.5 |
| sulfur | 5 |
| cobalt naphthenate | 3 |

TABLE 5

| | Comparative Example | | | Example | | | | | |
|---|---|---|---|---|---|---|---|---|---|
| | 4 | 5 | 6 | 9 | 10 | 11 | 12 | 13 | 14 |
| Application to steel cord | no application | alkylbenzene sulfonate | sorbitan monooleate | organic boron compound | | | | | |
| | | | | No. 1 | No. 2 | No. 3 | No. 4 | No. 5 | No. 6 |
| Initial adhesion property | A | A | A | A | A | A | A | A | A |
| Adhesion property after heat aging | B | B | B | B | B | B | B | B | B |
| Adhesion property after being left to stand in high humidity atmosphere | C | A | A | A | A | A | A | A | A |
| Resistance to corrosion fatigue | 100 | 280 | 280 | 520 | 460 | 490 | 470 | 530 | 470 |

As seen from Table 5, the rust preventive treating agent according to the invention has no bad influence upon the initial adhesion property and adhesion property after heat aging between rubber and cord and an effect of considerably improving the adhesion property under humidity condition. Furthermore, it exhibits a large improving effect on the resistance to corrosion fatigue.

EXAMPLES 15~20, COMPARATIVE EXAMPLES 7~9

There were provided 9 radial tires for truck and bus having a tire size of 10.00 R20 by applying steel cords of Comparative Examples 4~6 and Examples 9~14 shown in Table 5 to a carcass ply of the tire.

In order to accelerate the corrosion of the tire, 300 cc of water was fed between tire and rim and then the tire was run on a drum over a distance of 50,000 km. After the running, the steel cord-rubber composite body was taken out from the tire and then the adhesion properties and resistance to corrosion fatigue were evaluated in the same manner as in Example 9 to obtain results as shown in Table 6.

TABLE 6

| | Comparative Example | | | Example | | | | | |
|---|---|---|---|---|---|---|---|---|---|
| | 7 | 8 | 9 | 15 | 16 | 17 | 18 | 19 | 20 |
| Application to steel cord | no application | alkylbenzene sulfonate | sorbitan monooleate | organic boron compound | | | | | |
| | | | | No. 1 | No. 2 | No. 3 | No. 4 | No. 5 | No. 6 |
| Adhesion property after running on drum | C | A | A | A | A | A | A | A | A |
| Resistance to corrosion fatigue of cord | 100 | 140 | 150 | 230 | 200 | 220 | 200 | 230 | 210 |

As seen from Table 6, the tires using the steel cords treated with the rust preventive treating agents according to the invention are excellent in the adhesion properties and resistance to corrosion fatigue.

As mentioned above, according to the invention, the particular organic boron compound is compounded with rubber ingredient in a particular amount to form a rubber composition for covering steel cords, or is applied as a rust preventive treating agent to steel cord, so that the resistance to corrosion fatigue of steel cord can considerably be improved with satisfactorily holding initial adhesion property, adhesion property after heat aging and adhesion property after being left to stand in high humidity atmosphere between rubber and cord.

What is claimed is:

1. A steel cord-rubber composite body produced by adhering rubber to steel cord and vulcanizing it, characterized in that a rust preventive treating agent consisting of at least one organic boron compound represented by the following general formula:

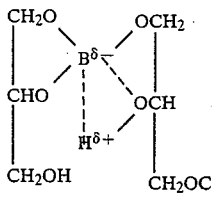 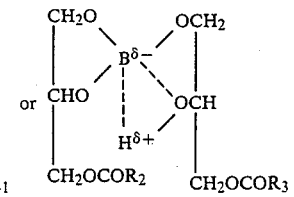

wherein each of $R_1$, $R_2$ and $R_3$ is an alkyl group having a carbon number of 7~21 and may be substituted with a hydroxyl group, is formed as a protective layer on the surface of the steel cord.

2. The steel cord-rubber composite body according to claim 1, wherein said organic boron compound is selected from glycerol borate laurate, glycerol borate palmitate, glycerol borate stearate, glycerol borate oleate, glycerol borate isostearate and glycerol borate hydroxystearate.

3. The steel cord-rubber composite body according to claim 1, wherein said organic boron compound is dissolved in a solvent and then applied to said steel cord to form said protective layer on the surface of said cord.

4. The steel cord-rubber composite body according to claim 3, wherein said protective layer has a thickness of 20 μm at maximum.

* * * * *